US008732128B2

(12) United States Patent
Wang et al.

(10) Patent No.: US 8,732,128 B2
(45) Date of Patent: May 20, 2014

(54) SHADOW COPY BOOKMARK GENERATION

(75) Inventors: Xiaopin Wang, Beijing (CN); Haiyang Zhang, Beijing (CN); Shaorong Li, Beijing (CN)

(73) Assignee: CA, Inc., Islandia, NY (US)

( * ) Notice: Subject to any disclaimer, the term of this patent is extended or adjusted under 35 U.S.C. 154(b) by 17 days.

(21) Appl. No.: 13/216,737

(22) Filed: Aug. 24, 2011

(65) Prior Publication Data

US 2013/0054529 A1 Feb. 28, 2013

(51) Int. Cl.
*G06F 17/30* (2006.01)
(52) U.S. Cl.
CPC .................. *G06F 17/30088* (2013.01)
USPC .......................................................... 707/639
(58) Field of Classification Search
None
See application file for complete search history.

(56) References Cited

U.S. PATENT DOCUMENTS

| 2006/0053332 A1* | 3/2006 | Uhlmann et al. ................. 714/2 |
| 2006/0123210 A1* | 6/2006 | Pritchett et al. ............... 711/162 |
| 2007/0006018 A1* | 1/2007 | Thompson et al. ............... 714/6 |

* cited by examiner

*Primary Examiner* — Robert Beausoliel, Jr.
*Assistant Examiner* — Nirav K Khakhar
(74) *Attorney, Agent, or Firm* — Pillsbury Winthrop Shaw Pittman LLP

(57) ABSTRACT

Systems and methods for generating a bookmark for a snapshot of one or more volumes of a production server include initiating a snapshot process to capture a shadow copy of a snapshot-volume set, which includes one or more volumes of the production server. The snapshot process (e.g., Volume Shadow Copy Service of Windows™ operating system) may include (a) temporarily freezing operations on a file system of the production server, and (b) releasing a freeze of operations on the file system of the production server. A bookmark for the shadow copy (representing a consistent state of the associated volumes) may be generated such that the bookmark corresponds to a completion of the temporarily freezing or releasing a freeze of the operations. The bookmark may include a point in time of the completion of the temporarily freezing or releasing the freeze of the operations.

32 Claims, 2 Drawing Sheets

SHADOW COPY BOOKMARK GENERATION

FIELD OF THE INVENTION

The invention generally relates to shadow copy and consistency bookmark generation for data backup and recovery.

BACKGROUND OF THE INVENTION

Data replication for backup and recovery purposes can be achieved by creating a shadow copy of one or more storage volumes, e.g., in a production server. Such replication may be done, for example, using Volume Shadow Copy Service (VSS) utility of the Windows™ operating system. A VSS command may be issued to take a volume snapshot periodically such as, for example, every fifteen minutes, to ensure that all existing application transactions are placed on a temporary hold, and all application data and data in a cache memory of a file system are flushed to disk.

A bookmark representing, for example, a point in time when the snapshot or shadow copy is generated may be beneficial, as the bookmark may represent a consistent state of the protected data when the snapshot was taken, e.g., a state of protected data to which users can rewind back for data recovery. For instance, data can be restored to a point in time indicated by the bookmark at which the data is application consistent, i.e., the restored data is equal to those of the snapshots at that time point. Moreover, such bookmark may indicate a transition phase used to distinguish between two phases of data backup process, i.e., initial synchronization phase and replication phase.

However, it may be difficult to record an accurate point in time, and thus generate an associated bookmark, when a consistent state for a snapshot is achieved. For example, conventionally, a pseudo software provider may be given higher priority as compared to a system provider and may be selected by a shadow copy process for generation of a snapshot of storage volumes at the production server and capturing the point in time of the snapshot. However, pseudo software providers are known to respond to commit snapshot events of a replication service, e.g., VSS, in specific snapshot-generation cases where the snapshot may merely indicate directory structure and attributes of data items in the storage volumes, and not necessarily actual data in the storage volumes. Accordingly, because a pseudo software provider may not generate snapshots capturing actual data, the snapshots generated by the pseudo software provider may not represent a consistent state of captured data. In some embodiments, where only one application, e.g., ArcServer RHA utilizes VSS, the pseudo software provider may be used to generate consistency bookmarks for other applications, e.g., SharePoint, Hyper-V, etc., that may be used for data recovery. However, in cases where more than one application utilize VSS, those applications may also warrant the use of pseudo software provider as the VSS provider, which, as discussed above, does not capture actual data in the snapshots. Therefore, in scenarios where the pseudo software provider is selected for VSS by multiple applications, a point in time (or bookmark) corresponding to consistent backup data may not be generated. Moreover, a pseudo software provider may not be used for periodic data replication scenarios, where snapshots including actual data beside the consistency bookmarks need to be generated.

Thus, it is desirable to develop and provide an improved technique for generating a consistency bookmark in the shadow copy or snapshot generation process, while minimizing any modification to the shadow copy process, or without slowing down, or otherwise negatively impacting the replication process.

SUMMARY

In some implementations, the invention provides systems and methods for generating a bookmark corresponding to a snapshot of one or more volumes of a master server (e.g., a production server), which may be later copied on to a replica server (e.g., a backup server). Systems and methods described herein provide mechanisms to determine a consistency bookmark for a shadow copy, e.g., generated by a shadow copy service or process (e.g., VSS), by utilizing one or more known input/output (I/O) control commands, or execution timing thereof, issued by the shadow copy service as part of snapshot/shadow copy generation.

A system for generating a bookmark corresponding to a snapshot of one or more volumes of a master (or production) server may include a master application, which may reside in or otherwise be operatively associated with the master server. The master application may be or include a computer application (or plurality of applications capable of communicating with one another) having one or more modules thereon, which when executed, perform bookmark generation at the master server, and data replication from a master server to a replica server.

In some implementations, the one or more modules may include instructions causing one or more processors to initiate a snapshot process (e.g., VSS) to capture a shadow copy of a snapshot-volume set including one or more volumes of the production server. In some implementations, the shadow copy may be stored locally in a storage device (e.g., a disk) at the production server. The snapshot process may be performed periodically, e.g., either manually by an administrator, or automatically per a pre-defined time period. In some implementations, prior to capturing the shadow copy, the snapshot process may identify the set of one or more volumes of the production server that are to be included in the snapshot process, wherein the identified one or more volumes are associated with one or more applications currently executing on the production server.

In some implementations, the snapshot process may include (a) temporarily freezing or inactivating operations affecting a data-storage system (e.g., file system) of the production server, and (b) releasing a freeze of or reactivating the operations affecting the data-storage system of the production server. The operations performed on or otherwise affecting the data-storage system may include "write" operations that add, modify, or both, one or more files, if the data-storage system is the file system of the production server, otherwise, such operations may include "write" operations that add, modify, or both, one or more data items stored in one or more volumes of the production server.

In some implementations, a bookmark may be generated for the shadow copy of the snapshot-volume set, based on and corresponding to an execution stage (e.g., completion) of the temporary inactivation of said operations or an execution stage (e.g., completion) of the freeze release or reactivation of said operations. In some implementations, the bookmark includes a point in time related to the execution stage (e.g., completion time point) of the temporary inactivation or reactivation of said operations. The bookmark may further include an identifier associated with the initiation of the snapshot process.

In some implementations, the one or more processors may be further caused to record the generated bookmark as an event in an event sequence created and maintained in a memory at the production server. Such event sequence may include operation events corresponding to, e.g., one or more of write, change security, change property, truncate, rename, remove, or create operations performed on data items stored in the one or more volumes of the snapshot-volume set. In some implementations, one or more operation events may be recorded in the event sequence without recording data content associated with the corresponding operations. In some implementations, at least a part of the event sequence may be sent to the replica or backup server as part of the replication process.

In some implementations, the invention provides methods for data replication from a master server to a replica server. In some implementations, the invention may include a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
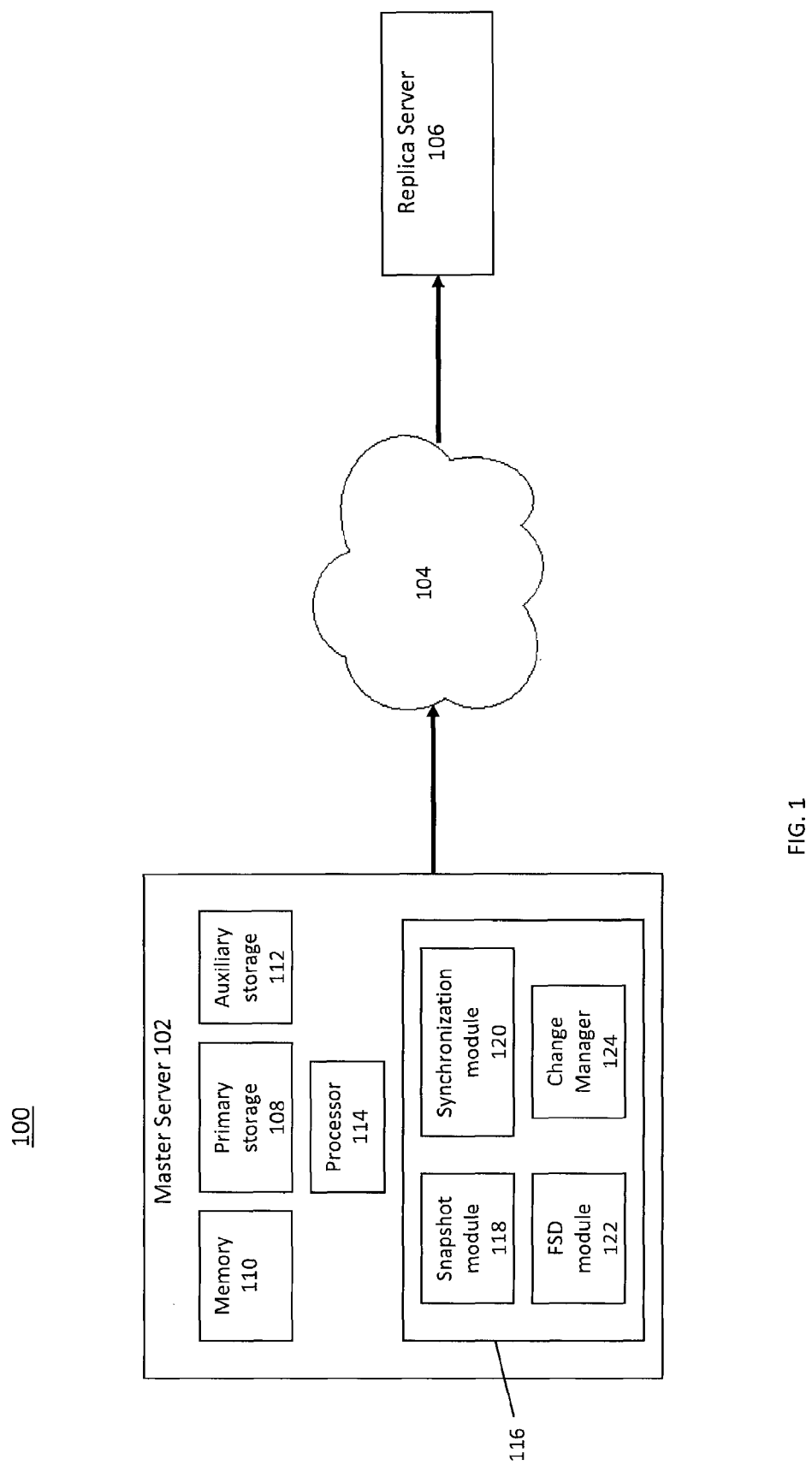
FIG. 1 illustrates an example of an environment that includes a system for performing data replication, according to various implementations of the invention.

In some implementations, the invention provides systems and methods for data replication from a master server to a replica server. FIG. 1 illustrates an example of an environment 100 in which a system for performing data replication resides. As depicted in FIG. 1, environment 100 includes a system for replicating data from a master server (e.g., a production server) to a replica server (e.g., a backup server). The system in the environment 100 may include a master server 102 communicatively coupled, via a network 104, to a replica server 106. Although only one master server 102 and replica server 106 is shown in FIG. 1, this is for illustrative purposes only. In some implementations, there may be a plurality of master servers 102 and/or a plurality of replica servers 106 connected via one or more networks 104 or otherwise connected to one another.

Master server 102 may store data to be backed-up or replicated (e.g., periodically or on-demand) to ensure that critical applications and data are available during outages. Outages may be planned (e.g., system maintenance), or unplanned (e.g., human error, viruses and other malware and natural disasters). Data considered for replication (i.e., replicated or protected data) may include or may be associated with data items operated on or updated by one or more components, functions, or applications executing (or executed) on master server 102. Such data items may include one or more data files or one or more directories or other data items stored in one or more volumes of a storage of master server 102, and may be sent to replica server 106 for replication. Furthermore, one or more components of master server 102 may be configured to capture a consistency bookmark for a snapshot or shadow copy of protected data (e.g., one or more data volumes) at master server 102. The consistency bookmark may represent an exact (or in some cases, an approximate) point in time when the snapshot or shadow copy was generated. In some implementations, such bookmarks are inserted into a sequence of events (e.g., that represent one or more operations at files, directories or volumes of master server 102) captured at master server 102. The bookmark itself may be captured as a unique event in the event sequence. In some implementations, every replication cycle or every replication and/or snapshot instance is considered an unique "scenario," job or task at master server 102 that protects data belonging to (or at least related to) one or more applications and/or directories. Master server 102 may run multiple scenarios to replicate data to different replica server 106. Accordingly, to differentiate each scenario from other, a unique scenario identifier is associated with each scenario, e.g., indicating initiation of each scenario. In some implementations, the scenario identifier is associated with and/or recorded with the corresponding consistency bookmark in the event sequence at master server 102.

Replica server 106 may be acting as a backup server to the master server 102. After an initial backup and replication (e.g., synchronization) of data items to be protected, further operations on the data items may be recorded as events without recording the data associated with the operations (i.e., changes to the data items). The events may be consolidated and sent to replica server 106, where these events may be used to update the already backed-up data items at replica server 106. The recorded events may be consolidated at master server 102, for example, using techniques described in U.S. patent application Ser. No. 12/775,066, entitled "Journal Event Consolidation," which is incorporated by reference herein in its entirety. This mechanism of using recorded events to update replicated data may reduce data redundancy in the replication process, thereby increasing replication and recovery speed, and decreasing CPU usage and network overhead.

Network 104 may include the Internet and/or other networks. It will be appreciated that this is not intended to be limiting, and that the scope of this disclosure includes implementations in which the master server 102 and the replica servers 106 are operatively linked via some other communication methodology, e.g., via a direct wired or wireless connection. In some implementations, environment 100 may include one or more elements other than master server 102 and replica server 106 (not shown).These other elements may include one or more servers, desktops, laptops, workstations, wireless devices (e.g., smartphones, personal digital assistants, etc.), routers, switches, and/or other network or other devices.

In some implementations, master server 102 may include a primary storage 108, a memory 110, an auxiliary storage 112 and/or other elements. Although storages 108, 112 and memory 110 (collectively referred to as the "storage units") are depicted as separate components in master server 102, they may be combined in one or two storage units. One or more of storage units 108, 110 and 112 may comprise electronic storage media that electronically stores information. Such electronic storage media may be provided integrally (i.e., substantially non-removable) to master server 102 and/or as removable storage that is removably connectable to master server 102 via, for example, a port (e.g., a USB port, a firewire port, etc.) or a drive (e.g., a disk drive, etc.). Storage units 108, 110 and 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Primary storage 108 may store the original data (e.g., files, directories and/or volumes to be backed-up), volume shadow/snapshot copies of the protected data (e.g., one or more data volumes), software algorithms, and/or other information that enables master server 102 to function as described herein. Memory 110 may store the events (including, e.g., one or more consistency bookmarks) associated with the operations on the protected data. Auxiliary storage 112 may store data (e.g., events and/or related information) transferred from memory 110 before being sent to replica server 106.

In some implementations, master server 102 may include a processor 114 may be configured to provide information processing capabilities in master server 102. As such, processor 114 may include one or more of a digital processor, an analog processor, a digital circuit designed to process information, an analog circuit designed to process information, a state machine, and/or other mechanisms for electronically processing information. Although processor 114 is shown in FIG. 1 as a single entity, this is for illustrative purposes only. In some implementations, processor 114 may include a plurality of processing units. These processing units may be physically located within the same device or computing platform, or processor 114 may represent processing functionality of a plurality of devices operating in coordination.

In some implementations, replica server 106 may act as a backup server to master server 102 and may include various components (not depicted in FIG. 1) such as user interfaces, processors, local storage systems, and so forth. Components similar to one or more of the components described above with respect to master server 102 (e.g., storage units 108, 110, 112 and processor 114) may be part of replica server 106. Such components may be used for the same or different functions as described above for master server 102.

In some implementations, master server 102 may run or operate a master application 116 for data change recordation and replication process. Master application 116 may be or include a computer application (or plurality of applications capable of communicating with one another) having one or more modules including a snapshot module 118, a synchronization module 120, a file system driver (FSD) module 122, and a change manager 124. In some implementations, the modules of master application 116 may include computer executable instructions embodied on computer readable storage media, e.g., primary storage 108. These computer executable instructions may be used to configure processor 114 of master server 102 for performing one or more features and functions, including those disclosed herein and/or other features and functions. In some implementations, master application 116 modules may be implemented across multiple applications and/or devices within environment 100 to perform the data replication features and functions described herein.

It should be appreciated that although modules 118, 120, 122, and 124 are illustrated in FIG. 1 as being co-located with a single processing unit, in implementations in which processor 114 includes multiple processing units, one or more of modules 118, 120, 122, and/or 124 may be located remotely from the other modules. The description of the functionality provided by the different modules, i.e., modules 118, 120, 122, and/or 124 described below is for illustrative purposes, and is not intended to be limiting, as any of modules 118, 120, 122, and/or 124 may provide more or less functionality than is described. For example, one or more of modules 118, 120, 122, and/or 124 may be eliminated, and some or all of its functionality may be provided by other ones of modules 118, 120, 122, and/or 124. As another example, processor 114 may be configured to execute one or more additional modules that may perform some or all of the functionality attributed below to one of modules 118, 120, 122, and/or 124.

In some implementations, one or more components (e.g., components 110, 112, and 114) and/or modules (e.g., 116, 118, 120, 122, and 124) of master server 102 may be distributed among multiple machines or may otherwise reside on one or more computing elements (e.g., servers or other machines) separate from but otherwise connected to master server 102.

In some implementations, snapshot module 118 may be configured to create a copy of at least a part of the data stored in master server 102, e.g., one or more data blocks, files, directories, volumes or other data stored in primary storage 108. In other words, snapshot module 118 may be configured to generate data block-level, file-level, directory-level or volume level snapshots of data in primary storage 108. In some implementations, snapshot module 118 may be configured to copy data in a cache memory of master server 102. Data items copied by snapshot module 118 may be or may be related to applications that are currently running on (or were recently executing on) master server 102 or any other element of the system, and/or are mission-critical. Snapshot module 118 may be configured to copy data items in a consistent state, i.e., create a shadow copy of the data items such that there may be no data change or update while the data items are being copied by snapshot module 118. Snapshot module 118 may store the copied data in a section of primary storage 108 or other section of master server 102 assigned for backup storage. Snapshot module 118 may create a shadow copy of data items in master server 102 periodically (e.g., every 15 minutes), or at command of a user or an administrator.

In one example, snapshot module 118 may utilize or otherwise incorporate Volume Snapshot Service (VSS) utility of the Windows™ operating system to create data snapshots or shadow copies of one or more volumes of master server 102. A typical VSS utility or service includes or is in communication with various components including, but not limited to, requestors, writes, and providers. Typically, requestors initiate shadow copy creation, i.e., invoke the VSS utility. In some implementations, requestors are management applications that manage shadow copy creation and usage, or fast recovery solutions which are specific products that reduce service level agreement (SLA) times for specific applications running on master server 102. The requestor may also communicate with the writers (described below) to gather information about what should be backed up and how it should be backed up in the shadow copy.

Writers, typically, are software included in applications and services that help provide consistent shadow copies, and serve two main purposes:
  When applications and services are running, the writer responds to signals provided by the VSS service interface to allow applications to prepare and quiesce their data stores for shadow copy creation and to ensure that no writes occur on the volume while the shadow copy is being created. (During quiescence, applications make data on the disk consistent. For example, an application might flush its buffers to disk or write out in-memory data to disk.)
  The writer also provides information about the application name, icons, files to include or exclude, and a strategy to restore the files.

If an application or service is not running, and the writer cannot respond to the requesting backup application, it may be assumed that all data on the volume is consistent, the databases are closed, and no additional effort is required to perform the backup. Writers may also provide information about restoring the data on a data item-by-data item basis, e.g., for restoration of files, directories or volumes of data stored at master server 102. In some implementations, there may be no writer available or at all provided as a component for VSS utility. In such cases, a shadow copy is still generated by the VSS service, but data is copied in whatever form it is in at the time of the copy. This means that there might be inconsistent data that is now contained in the shadow copy. This data inconsistency is caused by incomplete writes, data buffered in the application that is not written, or open files that are in the middle of a write operation. Even though the file system flushes all buffers prior to creating a shadow copy, the data on the disk can only be guaranteed to be crash-consistent if the application has completed all transactions and has written all of the data to the disk. (Data on disk is "crash-consistent" if it is the same as it would be after a system failure or power outage.)

In the context of shadow copy creation, providers serve as an interface to the point-in-time imaging capabilities—either on the storage array (hardware-based) or in the operating system (software based). Providers manage running volumes and create shadow copies of them on demand. In response to a request from a requestor, the VSS service signals applications that a shadow copy is about to be created, then signals the provider to create and maintain that shadow copy until it is no longer needed. Hardware providers may be implemented as a user-mode component which communicates with the hardware that will expose the shadow copy data. Windows Server 2003 includes a system software provider with shadow copy functionality. Alternatively, other hardware and software vendors can develop their own hardware or software providers to provide point-in-time imaging functionality. For example, Windows Server 2003 supports multiple hardware and software providers that can be used in combination to solve many different IT operational scenarios.

The VSS service may select the provider to use during shadow copy creation in the following order: (1) Hardware provider, (2) Software provider, and (3) System software provider. However, if a specific IT operational problem requires it, the requestor can override this hierarchy. Following is a description of various providers that may be used in one or more implementations of snapshot module 118 described herein.

Hardware-based Providers: Hardware-based shadow copy providers act as an interface between the VSS service and the hardware level by working in conjunction with a hardware storage adapter or controller at or associated with master server 102. The work of creating the shadow copy is performed by a host adapter, storage appliance, or RAID controller outside of the operating system implemented on master server 102. Hardware providers always take the shadow copy of an entire logical unit (LUN) of primary storage 108, but the VSS service will only expose the shadow copy of the volume or volumes that were requested by the requestor. While a hardware-based shadow copy provider makes use of the VSS service functionality that defines the point in time, allows data synchronization, manages the shadow copy, and provides a common interface with backup applications, the VSS service may not specify the underlying mechanism by which the hardware-based provider produces and maintains shadow copies.

Software-based Providers: Software-based shadow copy providers typically intercept and process I/O requests in a software layer between the file system and a volume manager software at master server 102. These providers may be implemented as a user-mode DLL component and at least one kernel-mode device driver, typically a storage filter driver. The work of creating these shadow copies is done in software. A software-based shadow copy provider may maintain a "point-in-time" view of a volume by having access to a data set that can be used to recreate volume status prior to the shadow copy. An example of this is the copy-on-write (COW) technique of a system provider. However, the VSS service places no restrictions on what technique software-based providers use to create and maintain shadow copies. A software provider is typically applicable to a wider range of storage platforms than a hardware-based provider and be able to work equally well with basic disks or logical volumes.

System Provider: A system provider is supplied as a default part of the operating system, e.g., Windows Server 2003, implemented on master server 102. While a default provider is supplied as part of the master server's operating system, other vendors are free to supply their own implementations that are optimized for their own storage hardware and software applications. To maintain the "point in time" view of one or more volumes contained in a shadow copy, the system provider uses a copy-on-write (COW) technique. Copies of the blocks on volume that have been modified since the beginning of the shadow copy creation are stored in a shadow copy storage area. The system provider can expose the production volume, which can be written to and read from normally. When the shadow copy is needed, it logically applies the differences to data on the production volume to expose the complete shadow copy. For the system provider, the shadow copy storage area is typically on an NTFS volume. The volume to be shadow copied may not need to be an NTFS volume, but at least one volume mounted on the system is preferred to be an NTFS volume.

Figure 2:
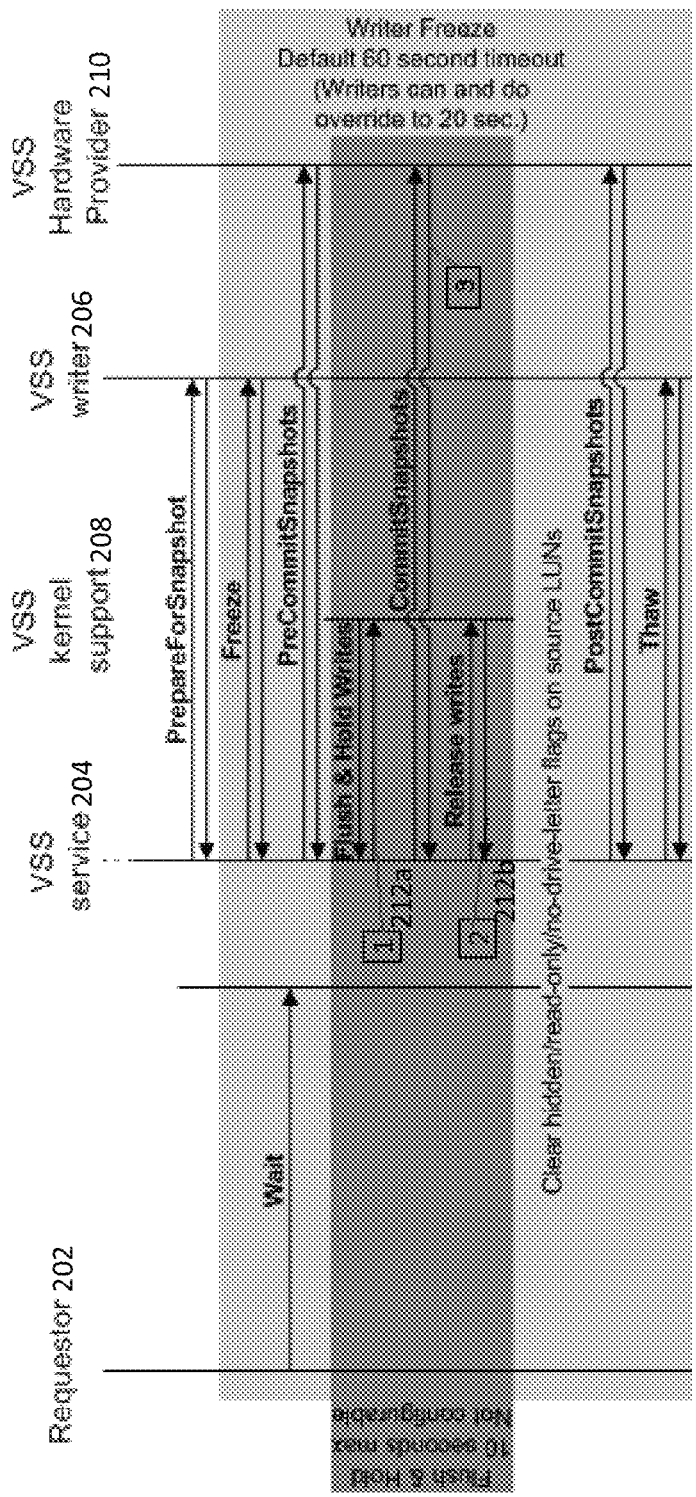
FIG. 2 illustrates an example of instruction flow between various components for snapshot generation process, according to various implementations of the invention.

VSS service implemented on snapshot module 118 may communicate and/or coordinate with one or more of the requestor, writer and provider to complete the snapshot generation process. FIG. 2 illustrates an exemplary snapshot/shadow copy generation process 200 including an exemplary instruction flow between various components (not shown in FIG. 1) within or otherwise associated with snapshot module 118. As shown, to start a shadow copy generation process, requestor 202 asks VSS service 204 to enumerate the writers (e.g., write 206), gather the writer metadata, and prepare for shadow copy creation. Writer 206 creates an XML description of the backup components to VSS service 204, and defines a data restore method. VSS service 204 then notifies writer 206 to prepare its data (e.g., application-specific data, cache data, etc.) for making a shadow copy.

Based on the notification from VSS service 204, writer 206 prepares the data in an appropriate way, e.g., by completing all open transactions (e.g., read, write, add, and/or modify transactions related to one or more applications), rolling transaction logs, and flushing one or more cache memories. For example, writer 206 may identify and prepare the one or more volumes of master server 102 that need to be backed up, e.g., because those volumes are associated with, or are accessed and affected by one or more applications. Writer 206 may identify such volumes are the volumes in a snapshot-volume set. In some implementations, various applications, such as, SharePoint, HyperV, etc., may be performing one or more operations on, or otherwise be associated with the volumes of the snapshot-volume set. Accordingly, writer 206 may be configured to find all current operations (e.g., add, modify, write, etc.) to be performed on the files or other data items of one or more volumes, directly or indirectly, by the SharePoint application, and incorporate those affected one or more volumes in the snapshot-volume set. In some implementations, writer 206 may be configured to identify HyperV application files that relate to the virtual machine (VM) images that users choose, and only flush those files to disk as part of preparation for the snapshot process. Writer 206 may further be configured to identify and incorporate the volume (s) associated with those VM image files in the snapshot-volume set. When adding volumes to the snapshot-volume set, mount point or reparse point of the applications may also be considered. For instance, if a file, "file 1" at path "c:\dir1\file1" is to be protected in the snapshot, the corresponding volume to be added in the snapshot set is "c drive," if "dir1" is a normal/regular directory in that drive. However, if "dir1" is a mount point or a junction directory referring to another volume, the volume that is referred to by that mount point/reparse point is the volume added to the snapshot-volume set. When the snapshot-volume set is identified and related data is prepared for shadow copy creation, writer 206 notifies VSS service 204 about the same.

At this point, VSS service 204 initiates the "commit" shadow copy phase. For example, VSS service 204 sends an instruction to writer 206 to quiesce their data and temporarily freeze application I/O write requests (I/O read requests may still be possible) for several seconds (e.g., 60 seconds or less) during which the shadow copy of the snapshot-volume set is created. After completing, the temporarily freeze of application I/O write requests, VSS service 204 may then send an instruction to the data-storage system (e.g., the file system) of master server 102 that (using, e.g., VSS kernel support 208) flushes the system buffer(s), and then temporarily freezes the data-storage system (i.e., label 212*a*). The data-storage system temporary freeze (e.g., lasting 10 seconds or less) ensures that system metadata is properly flushed and written to disk, and that the actual data in the buffer(s) is written in a consistent order.

At the completion of the temporary freeze of the data-storage system, VSS service 204, may instruct provider 210 (e.g., hardware provider, software provider, or system provider) to create a shadow copy of the snapshot-volume set. During the shadow copy-creation period, all write I/O requests remain frozen, i.e., remain inactivated.

At the completion of the shadow copy/snapshot creation, VSS service 204 may send another instruction to VSS kernel support 208 to thaw/unfreeze/release the temporary freeze of the data-storage system (e.g., the file system) of master server 102 such that operations (e.g, write I/O operations) to the system are reactivated (i.e., label 212*b*). After the shadow copy is created, the Volume Shadow Copy Service releases the writers from their temporary inactive phase and all queued write I/Os are completed. Further, VSS service 204 instructs writer 206 to release the temporary freeze of application I/O operations (e.g., write I/O operations), such that applications (e.g., SharePoint, HyperV, etc.) are free to write data the backed up volumes.

VSS service 204 may also query writer 206 to confirm that application I/O operations (e.g., write operations) were successfully frozen during the shadow-copy creation (performed by provider 210). If writer 206 notifies that application operations were not successfully frozen (meaning that the shadow copy data is potentially inconsistent), the shadow copy is deleted and requestor 202 is notified about the same. Requestor 202 may then retry the shadow copy generation process from the beginning (as described above), or notify the administrator of master server 102 to retry at a later time.

However, if the copy is successful, VSS service 204 gives the location information for the shadow/snapshot copy back requestor 202.

Referring again to FIG. 1, in some implementations, synchronization module 120 may be configured to perform an initial synchronization between master server 102 and replica server 106. This initial synchronization may include comparing the snapshot data copied by snapshot module 118 (and stored at master server 102) and data residing at the replica server 106 to identify any differences, and sending the differences to replica server 106. The synchronized data at replica server 106 may indicate an initial consistent state at replica server 106 and may be used as the starting point for future replications of the data changes or updates at master server 102.

In some implementations, synchronization module 120 may perform initial synchronization in different ways. For example, in some implementations, synchronization module 120 compares and sends all file content read from the snapshots created by snapshot module 118. Regardless of any file and/or directory updates that may have occurred under one or more protected directories during the synchronization, the data for comparison between master server 102 and replica server 106 are read from snapshots already created by snapshot module 118, which will not be affected by these changes. After comparison, data representing or related to any differences between master server 102 and replica server 106 may also be read from snapshots by snapshot module 118. Accordingly, replica server 106 is synchronized with master server 102 with a consistent state base corresponding to the "beginning" of the synchronization.

In some implementations, synchronization module 120 may be configured to utilize data stored in original relevant volumes of master server 102, instead of data from the snapshots generated by snapshot module 118, for initial synchronization. A first snapshot may be generated by snapshot module 118, which may be used by synchronization module 120, for example, to first build a directory structure including path and names of files and/or directories copied in the first snapshot taken. As described below, a point in time of the first snapshot may be recorded by FSD module 122. For comparison between master server 102 and replica server 106, synchronization module 120 may first enumerate all file and/or directory full paths from the built directory structure, and then read the file content from the original volumes that reflect the most current data changes in those files and/or directories. If a difference is identified in the data read from the original volumes and what replica server 106 stores, data corresponding to that difference are sent to replica server 106 to complete synchronization. In this instance, after synchronization, replica server 106 usually receives an inconsistent base due to file/directory changes that may have occurred in the original volumes during the synchronization process but that may not have been captured in the directory structure built from the snapshots. Accordingly, to bring replica server 106 to a consistent state, a second snapshot may be created by snapshot module 118 immediately after the initial synchronization. A point in time of the second snapshot may be recorded by FSD module 122. The second snapshot may then be later utilized in the next replication cycle to backup the data changes that occurred at master server 102 between the points in time of the first and second snapshots, or during synchronization. Accordingly, in this instance, replica server 106 is synchronized to a consistent base corresponding to the "end" of the replication cycle.

In some implementations, file system driver (FSD) module 122 may capture and record any operations, changes or updates related to the data of the relevant and protected files and/or directories of, e.g., the snapshot-volume set or some other volumes of master server 102. FSD module 122 may capture the data operations and/or changes in real time before or during synchronization (performed, e.g., by synchronization module 120) and between two particular time instants, e.g., between a first time instant, or a first bookmark (related to a first snapshot time) and a second time instant or a second bookmark (related to a second snapshot time). In some implementations, FSD module 122 may record those operations and/or changes as journal events in a raw journal stored in the memory 112. In some instances, journal events may include information related to, for example, time and type of operation performed and other operation-related information. Examples of such journal events are listed in Table 1.

TABLE 1

| Type | Description |
| --- | --- |
| WRITE | Write data to a file |
| TRUNCATE | Truncate data from a file |
| CREATE | Create a file or directory |
| OPEN | Open a file or directory |
| CLOSE | Close a file or directory |
| CLOSE_REMOVE | Delete on close for a file or directory |
| REMOVE | Delete a file or directory |
| RENAME | Rename a file or directory |
| CHANGE_ATTR | Change attributes or properties of a file or directory |
| CHANGE_SECURITY | Change the security (e.g., ACL) for a file or directory |

In some implementations, FSD module 122 may be configured to operate in "skip written data" mode in which FSD module 122 records the events without recording the actual data associated with those events. This mode may facilitate generating and recording events with a smaller event size. For example, for events such as WRITE, CHANGE_ATTR and CHANGE_SECURITY, FSD module 122 may be configured to only record the filename, timestamp and the range of changed data, but not the actual data, in the affected file. In some implementations, data related to such events may be recorded as and sent for replication (to the replica server 106) from periodic snapshots taken by snapshot module 118 in master server 102. In general, FSD module 122 may record at least operation type and time of the operation in each event type.

Further, in addition to recording the operations performed on the data blocks of protected files and/or directories, FSD module 122 may be configured to capture a consistency bookmark including, e.g., a point in time, representing a corresponding snapshot or shadow copy (i.e., a consistent state) of the snapshot-volume set generated by snapshot module 118. In some implementations, the consistency bookmark is captured by FSD module 122 as an event similar to journal events in a raw journal stored in the memory 112 (as described above). For example, like other journal events in an event sequence, a bookmark may be represented as an event object or a data structure, for example, instantiated by a class in an object oriented programming. Other file and directory manipulations captured by FSD module 122 as jounal events may also be represented as event objects. The consistency bookmark may allow rewinding back to a consistent state of the snapshot-volume set, i.e., to a state or version of snapshot-volume set at the time the bookmark was generated. Such "rewind" is made possible by following the undo events (e.g., counterpart of journal events) till the point in time indicated by the consistency bookmark. Moreover, there may be a scenario or job identifier associated with each execution of the snapshot process by snapshot module 118. In some implementation, the bookmark may include both the point in time and the scenario identifier of the snapshot. Such scenario identifier may also be associated or recorded with other events recorded by FSD module 112. Accordingly, events as well as consistency bookmarks may be grouped by scenario identifier at memory 112. Moreover, the scenario identifier is cleared at the completion of, and as an indication thereof, the generation of the consistency bookmark. In some implementations, FSD module 122 may not generate a consistency bookmark if no scenario identifier is generated or stored so as to avoid triggering of a snapshot generation merely for the purpose of generating a consistency bookmark.

In some implementations, FSD module 122 is in communication with snapshot module 118 such that FSD module 122 captures (or module 118 provides) information regarding the issuance or completion of one or more instructions issued by components (e.g., requestor 202, VSS service 204, writer 206, kernel support 208, provider 210) of snapshot module 118. Further, FSD module 122 may be configured to utilize information about an execution stage (e.g., issuance and/or completion), e.g. timing thereof, of one the instructions or commands to generate a bookmark. For example, in some implementations, FSD module 122 may generate a consistency bookmark at the time of the completion of temporary freeze instruction to the data-storage system (e.g., file system), indicated by and described above in associated with label 212a. Alternatively, FSD module 122 may generate a consistency bookmark at the time of the completion of instruction to release the temporary freeze of operations at the data-storage system (e.g., file system), indicated by and described above in associated with label 212b.

In some implementations, if FSD module 122 captures and records operations on volume level (instead of file level), i.e., it acts as a volume-level filter driver, module 122 may be configured to generate a consistency bookmark only at the time of the completion of instruction to release the temporary freeze, i.e., instruction labeled as 212b. It may be because there may be some pending write I/O instructions in the volume stack (e.g., snapshot-volume set) that will be handled by the volume driver (volsnap.sys) before VSS service 204 invokes provider 210 to commit snapshots.

In some instances, the events recorded by FSD module 122 may be redundant or become redundant after a period of time during the operation of master server 102. To reduce or remove redundancy among the already-recorded events or events being recorded in the real time by FSD module 122, change manager 124 may consolidate the events in memory 112. The consolidated events thus obtained from change manager 124 may be stored in auxiliary storage 112 before sending out to replica server 106. Change manager 124 may periodically (e.g., every 3 seconds) receive the journal events from the raw journal in memory 112 for consolidation. For certain event sets, like a set of events including multiple WRITE events, each including its respective data change range, change manager 124 may consolidate the data change range from all the WRITE events and generate a consolidated data change range to be eventually sent to the replica server 106. For example, change manager 124 may receive WRITE (3,7) and WRITE (4,10) events for a particular file indicating that new data was written, in one operation, in the file in a data change range from byte location 3 to byte location 7, and in another operation, in a data change range from byte location 4 to byte location 10, respectively. Change manager 124 may be configured to consolidate these two WRITE events to a WRITE (3, 10) event indicating that the file was updated with new data in a collective data change range from byte location 3 to byte location 10. The change manager 124 may perform such consolidation on-the-fly by consolidating the events already present at change manager 124 with the events being received from the raw journal. In some instances, the format of the events recorded by FSD module 122 (and stored in the raw journal) may not be compatible with the format supported by change manager 124. Accordingly, change manager 124 may be associated with a journal translator (not shown in FIG. 1) which first receives journal events from the raw journal, and translates and send the events in format compatible with and/or understood by change manager 124 for consolidation.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method to generate a bookmark corresponding to a snapshot of a volume of a production server, the method comprising:
    initiating, using a processor operatively associated with the production server, a snapshot process to capture a snapshot of a volume of the production server, wherein the snapshot process comprises (a) temporarily freezing write operations on a file system of the production server, and (b) releasing a freeze of write operations on the file system of the production server;
    generating, using the processor, a bookmark for the snapshot of the volume, wherein the bookmark comprises a point in time of a completion of said temporarily freezing write operations or a point in time of a completion of said releasing a freeze of write operations;
    recording, in a memory operatively associated with the production server, the generated bookmark as an event in an event sequence; and
    recording, as an operation event in the event sequence in the memory, an operation performed on a data item or a file stored in the volume of the production server, wherein the operation event is recorded in the event sequence without recording data content associated with the operation performed on the data item or the file in the event sequence.

2. The method of claim 1, wherein the bookmark further comprises an identifier associated with the initiation of the snapshot process.

3. The method of claim 1, further comprising:
    sending at least a part of the event sequence to a backup server.

4. The method of claim 1, wherein the operation comprises one or more selected from: write, change security, change property, truncate, rename, remove, or create operations.

5. The method of claim 1, wherein the snapshot process is performed periodically.

6. The method of claim 1, further comprising:
    identifying the volume of the production server, wherein the identified volume is associated with an application executing on the production server.

7. The method of claim 1, wherein the snapshot process is based on Volume Shadow Copy Service of Windows operating system.

8. A system to generate a bookmark corresponding to a snapshot of a volume of a production server, the system comprising a processor configured to:
    initiate a snapshot process to capture a snapshot of a volume of the production server, wherein the snapshot process comprises (a) temporarily freezing write operations on a file system of the production server, and (b) releasing a freeze of write operations on the file system of the production server;
    generate a bookmark for the snapshot of the volume, wherein the bookmark comprises a point in time of a completion of said temporarily freezing write operations or a point in time of a completion of said releasing a freeze of write operations;
    record, in a memory operatively associated with the production server, the generated bookmark as an event in an event sequence; and
    record as an operation event in the event sequence in the memory, an operation performed on a data item or a file stored in the volume of the production server, wherein the operation event is recorded in the event sequence without recording data content associated with the operation performed on the data item or the file in the event sequence.

9. The system of claim 8, wherein the bookmark further comprises an identifier associated with the initiation of the snapshot process.

10. The system of claim 8, wherein the processor is further configured to:
    send at least a part of the event sequence to a backup server.

11. The system of claim 8, wherein the operation comprises one or more selected from: write, change security, change property, truncate, rename, remove, or create operations.

12. The system of claim 8, wherein the snapshot process is performed periodically.

13. The system of claim 8, wherein the processor is further configured to:
    identify the volume of the production server, wherein the identified volume is associated with an application executing on the production server.

14. The system of claim 8, wherein the snapshot process is based on Volume Shadow Copy Service of Windows operating system.

15. A non-transitory computer readable medium holding computer executable instructions thereon, the computer-executable instructions, when executed by a processing device, cause the processing device to perform a method to generate a bookmark corresponding to a snapshot of a volume of a production server, the method comprising:
    initiating a snapshot process to capture a snapshot of a volume of the production server, wherein the snapshot process comprises (a) temporarily freezing a write operation on a file system of the production server, and (b) releasing a freeze of a write operation on the file system of the production server;
    generating a bookmark for the snapshot of the volume, wherein the bookmark comprises a point in time of a completion of said temporarily freezing write operations or a point in time of a completion of said releasing a freeze of write operations;
    recording, in a memory operatively associated with the production server, the generated bookmark as an event in an event sequence; and recording, as an operation event in the event sequence in the memory, an operation performed on a data item or a file stored in the volume of the production server, wherein the operation event is recorded in the event sequence without recording data content associated with the operation performed on the data item or the file in the event sequence.

16. The medium of claim 15, wherein the bookmark further comprises an identifier associated with the initiation of the snapshot process.

17. The medium of claim 15, wherein the method further comprises:
sending at least a part of the event sequence to a backup server.

18. The medium of claim 15, wherein the operation comprises one or more selected from: write, change security, change property, truncate, rename, remove, or create operations.

19. The medium of claim 15, wherein the snapshot process is performed periodically.

20. The medium of claim 15, wherein the method further comprises:
identifying the volume of the production server, wherein the identified volume is associated with an application executing on the production server.

21. The medium of claim 15, wherein the snapshot process is based on Volume Shadow Copy Service of Windows operating system.

22. A method to generate a bookmark corresponding to a snapshot of a volume of a production server, the method comprising:
initiating, using a processor operatively associated with the production server, a snapshot process to capture a snapshot of a volume of the production server, wherein the snapshot process comprises (a) temporarily freezing operations related to a file system of the production server, and (b) releasing a freeze of operations related to the file system of the production server;
generating, using the processor, a bookmark for the snapshot of the volume, wherein the bookmark comprises a point in time of a completion of said temporarily freezing operations or a completion of said releasing a freeze of operations;
recording, in a memory operatively associated with the production server, the generated bookmark as an event in an event sequence; and
recording, as an operation event in the event sequence in the memory, an operation performed on a data item or a file stored in the volume of the production server, wherein the operation event is recorded in the event sequence without recording data content associated with the operation performed on the data item or the file in the event sequence.

23. The method of claim 22, wherein the operations related to the file system of the production server comprises write operations on a file of the file system.

24. A method to generate a bookmark corresponding to a snapshot of a volume of a production server, the method comprising:
initiating, using a processor operatively associated with the production server, a snapshot process to capture a local copy of at least a part of stored data of the production server, wherein the snapshot process comprises (a) temporarily inactivating operations affecting a data-storage system of the production server, and (b) reactivating operations affecting the data-storage system of the production server;
generating, using the processor, a bookmark for the local copy of the at least part of stored data of the production server, wherein the bookmark comprises a point in time related to an execution stage of said temporarily inactivating operations or a point in time related to an execution stage of a completion of said reactivating operations;
recording, in a memory operatively associated with the production server, the generated bookmark as an event in an event sequence; and
recording, as an operation event in the event sequence in the memory, an operation performed on a data item or a file stored in the production server, wherein the operation event is recorded in the event sequence without recording data content associated with the operation performed on the data item or the file in the event sequence.

25. The method of claim 24, wherein the snapshot process is based on Volume Shadow Copy Service of Windows™ operating system, and the local copy is a shadow copy of the at least part of stored data of the production server.

26. The method of claim 24, wherein the at least part of stored data comprises a volume of the production server.

27. The method of claim 26, further comprising:
identifying the volume of the production server, wherein the identified volume is associated with an application executing on the production server.

28. The method of claim 24, wherein the data-storage system of the production server comprises a file system of the production server.

29. The method of claim 28, wherein the operations affecting the file system of the production server comprises an operation to add, modify, or both, a file of the file system.

30. The method of claim 24, wherein the operations affecting the data-storage system of the production system comprises an operation to add, modify, or both, a data item stored in a volume of the production server.

31. The method of claim 24, wherein the execution stage of said temporarily inactivating operations comprises a completion of said temporarily inactivating operations.

32. The method of claim 24, wherein the execution stage of said reactivating operations comprises a completion of said reactivating operations.

* * * * *